UNITED STATES PATENT OFFICE.

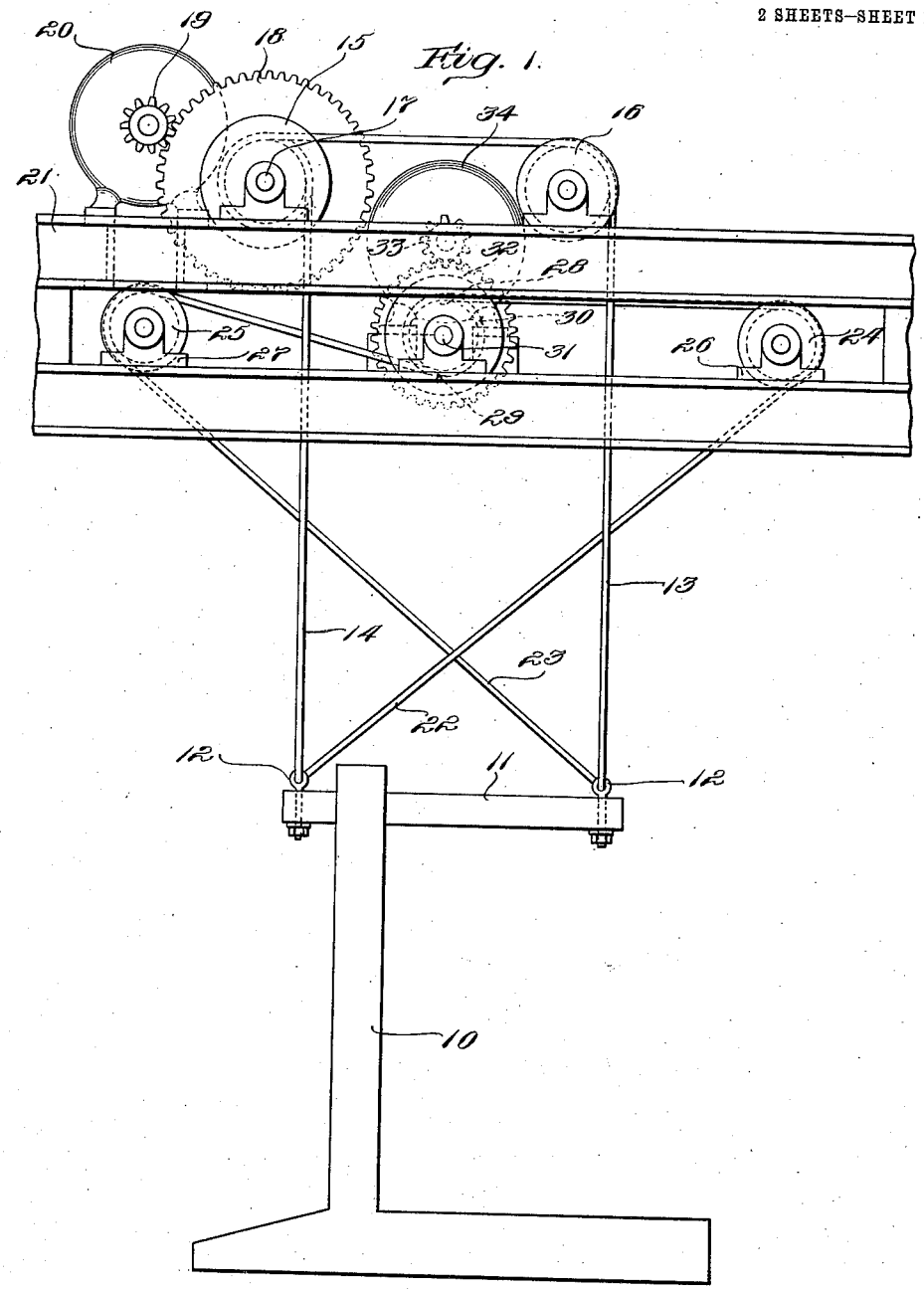

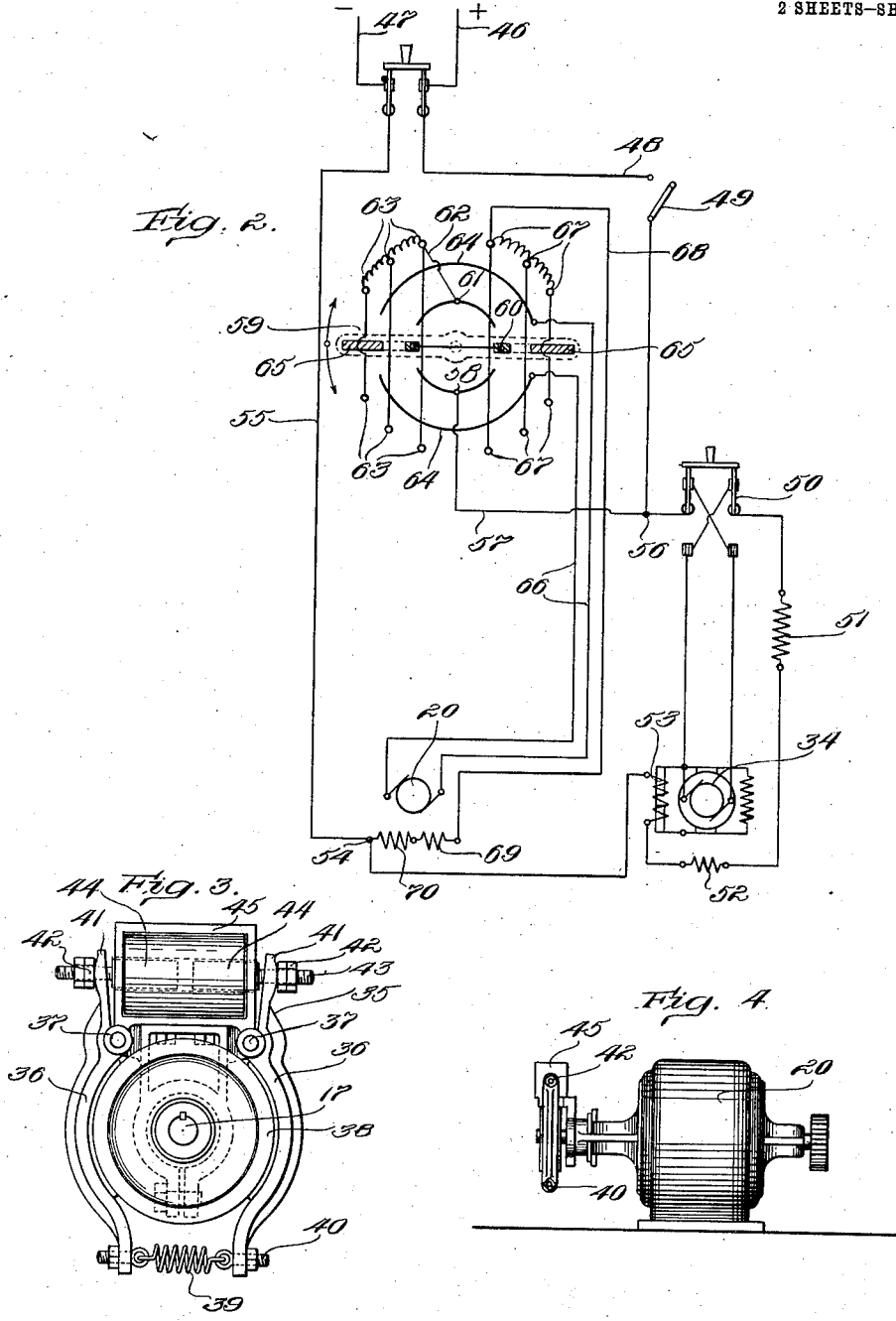

RAYMOND C. PENFIELD, OF NEW YORK, N. Y.

HOISTING MECHANISM FOR BRICK-SETTERS AND THE LIKE.

1,025,155. Specification of Letters Patent. Patented May 7, 1912.

Application filed June 8, 1911. Serial No. 632,055.

*To all whom it may concern:*

Be it known that I, RAYMOND C. PENFIELD, a citizen of the United States, and resident of New York, in the county and State of New York, have invented an Improvement in Hoisting Mechanism for Brick-Setters and the Like, of which the following description, in connection with the accompanying drawings, is a specification, like letters on the drawings representing like parts.

This invention relates to mechanism for raising and lowering a load, shown in the present instance as a brick setter, by means of cables or ropes, and providing means in connection therewith for rendering the brick setter or other part carried steady and preventing it from swinging to and fro.

The invention will be understood from the following description in connection with the accompanying drawings, wherein—

Figure 1 is a side elevation showing a brick setter conventionally and my improved operating mechanism; Fig. 2 is a diagrammatic view showing the electrical connections preferably employed in my improved apparatus; Fig. 3 is an end elevation showing a form of electric brake adapted for use with my invention; and Fig. 4 is a side elevation of a motor provided with such brake.

A brick setter is shown conventionally at 10, this typifying any part or mechanism which it may be desired to raise and lower by means of cables while keeping the same steady and preventing its swinging to and fro. The supporting frame or platform 11 of the setter has eye-bolts or other securing devices 12 at its ends, and is supported by ropes 13, 14 secured to these and adapted to be wound around a drum 15, the rope 14 depending downward directly therefrom and the rope 13 extending laterally over an idle sheave 16 at a point so as to depend vertically therefrom to the end of the frame 11. The drum 15 is mounted on a shaft 17 having fixed thereon a large gear wheel 18 driven by a pinion 19 of a motor 20, this motor being mounted on a suitable support 21 and the drum 15 and sheave 16 being likewise journaled in suitable bearings on said support. The eye-bolts or securing devices at the ends of the frame 11 have also fixed thereto crossed ropes 22, 23 extending outward considerably beyond the ropes 13, 14 and engaged over sheaves 24, 25 journaled in bearings 26, 27 on the support, these sheaves as shown being spaced apart considerably farther than are the drum 15 and sheave 16 from which the ropes 13 and 14 depend. The crossed ropes 22, 23, after passing around the sheaves 24, 25, are wound from above and beneath respectively as shown at 28, 29 upon a drum 30 fixed on a shaft 31 suitably journaled on the support. The shaft 31 has fixed thereon a large gear 32 driven by means of a pinion 33 from a motor 34 mounted on the support.

The motors 20 and 34 are equipped with electrically controlled brakes 35 of a known type, consisting of brake shoes 36 pivoted at 37 and normally drawn against a brake disk 38 by a contractile spring 39 fixed at its ends to the ends of the brake shoes, as by adjustable eye-bolts 40. The brake shoes 36 extend at the other sides of their pivot points in arms 41 which are engaged by adjustable nuts 42 threaded on extensions 43 of cores 44 slidable from the two ends of a solenoid 45 suitably mounted on the motor casing. Thus, while the solenoid 45 is energized, the cores 44 will hold the brake shoes 36 away from the brake disk 38 against the tension of spring 39; as soon as the solenoid is deënergized, however, the spring 39, acting upon the brake shoes, will draw them into engagement with the brake disk 38 and thus stop the motor and parts connected therewith.

Current energy for actuating the hoisting motor 20 and the stay-rope motor 34 is supplied from line terminals 46, 47. Current from the terminal 46 passes through lead 48, contact switch 49, reversing switch 50 and the armature of the stay-rope motor, resistance 51, through the field 52 of the stay-rope motor. Thence it passes through the brake solenoid 53 of the stay-rope motor, joining at 54 the line energizing the hoisting motor field, and through lead 55 to the other line terminal 47. Thus, with the switch 49 closed, a shunt current will always normally energize the stay-rope motor so that it has a tendency to wind the stay ropes up and keep them always taut. Current for energizing the hoisting motor branches from the line just described before passing through the stay-rope motor at 56, passing thence through a lead 57 to a terminal 58 of arcuate form on a hoist controller, generally designated 59. Thence it passes through a pivotally movable bridging contact 60 to a similarly formed arcuate contact 61. A lead 62 connects the contact 61 with the several contact points 63 of a controlling rheostat. The rheostat contacts 63 are connected with one or the other of opposite arcuate contacts 64 by movable bridging contacts 65 which may be mounted to move with the swinging bridge contact 60, being insulated therefrom. The leads 66 to the hoisting motor armature are interposed between the arcuate contacts 64 and thus, as the shifting contacts 65 are moved in one direction, e. g. upward, the motor will be driven in one direction, which may be its hoisting movement, while when said contacts are shifted in the other direction, the motor will be driven reversely to permit lowering of the brick setter. From the arcuate contact 64 current passes through the other bridging contact 65 to one of the rheostat terminals 67, whence it is conducted by a line conductor 68 to the field 69 and brake 70 of the hoisting motor. When the bridge contacts 60 and 65 are in intermediate position as shown in Fig. 2, all the contacts are broken so that the hoisting motor and its brake-restraining solenoid are deënergized, permitting the spring-actuated brake to become active to hold the setter in the position to which it has been moved.

The shunt current supplied to the stay-rope motor 34 is reduced by the resistance 51 so that, although it is normally always energized, its torque is insufficient to lift the brick-setting mechanism, and hence when the hoist controller is manipulated to lower the setting machine, the stay-rope motor is driven backward by the weight of the load, although it may be reversed if desired by the reversing switch 50. The stay-rope motor, however, has sufficient power so that its pull upon the crossed ropes 22, 23 will hold the setter steady from swinging movement, and these crossed ropes may be held absolutely unyielding by disconnecting the switch 49 whereby the stay-rope motor and its brake solenoid are both deënergized, causing the brake of said motor to become effective to hold the same and its actuated ropes 22, 23 from any movement whatever, so that these crossed ropes, in conjunction with the hoisting ropes 13, 14, hold the frame 11 and the setter substantially rigid, the crossed stay or guide ropes acting virtually as anchors to hold the setting machine steadily in place. This is an important feature in an apparatus of this kind, since, in machines for lifting bricks and other products, it is necessary to have a machine that can be kept in good equilibrium while being pushed into a unit of bricks or any obstruction that would have a tendency to swing it out of position. The stay-rope motor 34, being normally energized, keeps the slack in the stay ropes always taken up and these ropes taut so that the instant the hoisting motor is stopped, these stay ropes are ready to perform their function as guy ropes or anchors and, as the solenoid of the brake for the stay-rope motor is deënergized, the stay ropes may be instantly held fixed from all movement. The stay ropes are thus constantly in readiness to perform their function of holding the setting machine steady in whatever position of vertical adjustment it may be stopped.

I desire it to be understood that the use of terms in the foregoing specification and in the following claims is illustrative and not restrictive; for example where the term "rope" is used it is intended to include all equivalents thereof, such as chains, and the like.

Having described my invention, what 1 claim as new and desire to secure by Letters Patent is:

1. An apparatus of the kind described, comprising a carrier having flexible means for suspending and vertically adjusting the same, and other flexible means arranged to steady said carrier from sidewise movement in all positions of vertical adjustment thereof, said steadying means being held taut and extending transversely from said carrier to a fixed support.

2. An apparatus of the kind described, comprising a carrier, flexible means for supporting and vertically adjusting the same, and flexible means automatically operative in different positions of vertical adjustment of said carrier to steady the same from sidewise movement, said steadying means being held taut and extending transversely from said carrier to a fixed support.

3. An apparatus of the kind described, comprising a carrier having flexible means for suspending and vertically adjusting the same, and other flexible means engaging said carrier at separated points and having means to exert a lateral and upward pull at said points in different positions of vertical adjustment of the carrier to steady the same, said steadying means extending transversely from said carrier to a fixed support.

4. An apparatus of the kind described, comprising a carrier, means for suspending and vertically adjusting the same, and flexible means automatically operative on said carrier at separated points to exert an upward and lateral pull in opposite directions to steady the same from lateral movement, said steadying means extending transversely from said carrier to a fixed support.

5. An apparatus of the kind described, comprising a carrier, flexible means for supporting and vertically adjusting the same, stay ropes engaged with said carrier at separated points extending laterally therefrom to a fixed support, and a normally energized motor having connections to keep said stay ropes taut and hold said carrier from lateral movement, said ropes being arranged for mutual counter-balancing on the carrier of lateral pulls transmitted thereby.

6. An apparatus of the kind described, comprising a carrier, flexible means for suspending and vertically adjusting the same, a motor having connections to control said flexible means, said motor having an automatic brake, flexible means arranged to exert a lateral and upward pull at separated points on said carrier, and extending in crossed relation diagonally upward from the carrier to a fixed support, and means for normally holding said flexible means under tension.

7. An apparatus of the kind described, comprising a carrier, means for suspending and vertically adjusting the same, and flexible means engaging said carrier at separated points and extending thence diagonally upward to a fixed support to exert lateral and upward pulls thereon in converging lines in a common plane, said flexible means having connections to be held under tension in different positions of vertical adjustment of said carrier.

8. An apparatus of the kind described, comprising a carrier, means for suspending and vertically adjusting the same, flexible means engaging said carrier at separated points and extending thence diagonally upward to a fixed support to exert lateral and upward pulls thereon along converging lines in a common plane, and a normally energized motor having connections to take up slack in said flexible means and hold the same under tension.

9. An apparatus of the kind described, comprising a brick setter, means for suspending and vertically adjusting the same, stay ropes fixed to said setter at separated points extending laterally upward in a common plane and crossing each other, supporting sheaves for said ropes, a drum on which the same are wound, and a motor having connections to operate said drum and hold said stay ropes normally under tension.

In testimony whereof, I have signed my name to this specification, in the presence of two subscribing witnesses.

RAYMOND C. PENFIELD.

Witnesses:
S. H. SMART,
C. P. MERTENS.

---

Copies of this patent may be obtained for five cents each, by addressing the "Commissioner of Patents, Washington, D. C."